United States Patent
Ku

Patent Number: 6,142,175
Date of Patent: Nov. 7, 2000

[54] STRUCTURE OF A FLOATING-BALL VALVE

[76] Inventor: Chin-Kuang Ku, P.O. Box 82-144, Taipei, Taiwan

[21] Appl. No.: 09/332,040

[22] Filed: Jun. 14, 1999

[51] Int. Cl.[7] ............................. F16K 31/26; F16K 33/00
[52] U.S. Cl. ........................................... 137/446; 426/443
[58] Field of Search ..................................... 137/434, 441, 137/442, 443, 444, 445, 446, 426

[56] References Cited

U.S. PATENT DOCUMENTS

| | | | |
|---|---|---|---|
| 615,386 | 12/1898 | Gleason | 137/444 |
| 688,166 | 12/1901 | Gaylord | 137/444 |
| 812,337 | 2/1906 | Gray | 137/443 |
| 927,368 | 7/1909 | Mauldin | 137/445 |
| 1,579,140 | 3/1926 | Phillips | 137/444 |
| 1,612,857 | 1/1927 | Donnelly | 137/443 |
| 1,637,592 | 8/1927 | Ryan | 137/444 |
| 2,614,532 | 10/1952 | Steel | 137/443 |
| 2,715,415 | 8/1955 | Tucker | 137/442 |
| 2,724,403 | 11/1955 | De Salardi | 137/445 |

FOREIGN PATENT DOCUMENTS

| | | | |
|---|---|---|---|
| 139095 | 2/1920 | United Kingdom | 137/442 |

*Primary Examiner*—George L. Walton
*Attorney, Agent, or Firm*—A & J

[57] ABSTRACT

An improved structure of a floating-ball valve for industrial fluid comprising a valve seat, a valve insert, a cap, a crankshaft, a float and a floating arm, wherein a valve chamber is formed at the internal of the valve seat, and together with a water inlet are pipe hole of various diameter, the lower section of the valve chamber is provided with a water outlet and an elongated slot, at the bottom of the valve seat, a pair of corresponding protruded members are provided, and each is pivotally mounted with a rocking arm, one end of the crankshaft is connected to the floating arm, the valve insert is mounted within the valve chamber characterized in that a vertical water-blocking wall is formed in between the valve chamber and the water inlet, and the valve insert consists of a metallic valve stem and a plastic valve plug, the valve plug has a front protruded rim and a rear conic face, the external wall of the protruded rim is sealable with the wall of the water inlet to form a first water-blocking structure, and the conic face is sealable with the wall hole of the water-blocking wall to form a second water-blocking structure, the crankshaft is substantially L-shaped and pivots in between the two protruded members, the top end of the crankshaft is a rocking member being inserted into a cylindrical slot, and the other end is connected to the end of the floating arm, and an opening at the end of the valve seat is provided with a plurality of external threads for mounting with a threaded cap to seal the opening.

1 Claim, 11 Drawing Sheets

STRUCTURE OF A FLOATING-BALL VALVE

BACKGROUND OF THE INVENTION (a) Field of the Invention

The present invention relates to an improved structure of a floating-ball valve, in particular, to a floating-ball valve to be used in various type of water tank or water trough to automatically control water entrance to the tank or water level. This valve is particularly suitable to water tank for the high temperature steam producer or humidifier.

(b) Description of the Prior Art

ROC publication no. 31 9396 discloses a conventional floating-ball valve structure, as shown in FIGS. 1 to 4, comprising a valve seat 1, a valve insert 2, and an arm rod 31. The valve seat 1 is a pipe body with various internal diameters. A water passage is provided to the pipe body and a row of water-discharge holes 12 are provided within the large internal diameter of the pipe body. The pipe body per se is provided with a protruded member 13 and the valve insert 2 is a cylindrical mounting body mounted within the valve seat 1, and the external end of the arm rod 31 is connected to a floating-ball 5. The characteristics of the inventions are that: the water passage is provided with a conic face 10 (refer to FIG. 4), and the top end of the valve insert 2 has a mounting connection 21 of smaller external diameter, and the external diameter of the mounting connection 21 is larger than the small internal diameter of the valve body 1, and the front end of the mounting connection 21 has a conic face 211, which corresponds to the conic face 10 of the valve chamber 1, thereby, when the valve insert 2 is pushed towards the valve body 1 from the rear end thereof to the conic face 1, a closer seal is formed and the water passage of the valve body is thus blocked.

As the conic faces 10, 211 are metallic faces, their function as water blockage is not effective, and the mounting connection 21 of the surface of the conic face 211 will adsorb metallic debris after long period of water stream impact, and the function of water blockage for the conic surfaces is greatly reduced. In addition, the end opening of the valve insert 2 is not sealed and there is a small gap in between the valve seat 1 and the valve insert 2. Therefore, when water flows via the water inlet of the valve seat 1, a portion of the water stream will eject out from the end opening of the valve seat 1. If the valve is used on a stem producing apparatus, humidifier, or/and humidifying device, then, the discharged water stream (or steam) mixed with high temperature steam will be discharged via a transporting pipe. Thus, the steam contained chilled water is re-directed to the room, as a result, the chilled water is not vaporized but the humidity of the room is increased. Thus, the conventional floating-ball valve is not suitable to be used in all industrial purposes. Further, during water entering the valve seat 1, the movement of the valve insert 2 only provides half opening of the discharge hole 12 (being unable of fully opened), and the speed of water stream is too slow, which causes the water stream to eject out from the end opening of the valve seat 1. Thus, the moving distance of the valve insert 2 and the structure of the valve insert 2 have to be improved in order to provide normal water discharge.

SUMMARY OF THE INVENTION

Therefore, it is an object of the present invention to provide an improved structure of a floating-ball valve for industrial fluid comprising a valve seat, a valve insert, a cap, a crankshaft, a float and a floating arm, wherein a valve chamber is formed at the internal of the valve seat, and together with a water inlet are pipe hole of various diameter, the lower section of the valve chamber is provided with a water outlet and an elongated slot, at the bottom of the valve seat, a pair of corresponding protruded members are provided, and each is pivotally mounted with a rocking arm, one end of the crankshaft is connected to the floating arm, the valve insert is mounted within the valve chamber characterized in that a vertical water-blocking wall is formed in between the valve chamber and the water inlet, and the valve insert consists of a metallic valve stem and a plastic valve plug, the valve plug has a front protruded rim and a rear conic face, the external wall of the protruded rim is sealable with the wall of the water inlet to form a first water-blocking structure, and the conic face is sealable with the wall hole of the water-blocking wall to form a second water-blocking structure, the crankshaft is substantially L-shaped and pivots in between the two protruded members, the top end of the crankshaft is a rocking member being inserted into a cylindrical slot, and the other end is connected to the end of the floating arm, and an opening at the end of the valve seat is provided with a plurality of external threads for mounting with a threaded cap to seal the opening.

Yet another object of the present invention to provide an improved structure of a floating-ball valve, wherein the combination of the valve insert and the valve seat provides an effective, two steps water blockage function.

Yet a further object of the present invention is to provide an improved structure of a floating-ball valve, wherein the end opening of the valve seat is sealed with a cap such that water stream will not eject out from the opening.

A further object of the present invention is to provide an improved structure of a floating-ball valve, wherein the angle of the floating arm can be changed if appropriate. Thus, the angle of the floating arm can be adjusted with respect to the structure of the water tank.

It is yet another object of the present invention to provide an improved structure of a floating-ball valve, wherein the water hole can be fully opened to allow smooth and rapid water flow.

The foregoing and other objects of the invention will become apparent in reading the following detailed description and in reference to the following drawings, in which:

DETAILED DESCRIPTION OF THE PRESENT INVENTION

Figure 1:
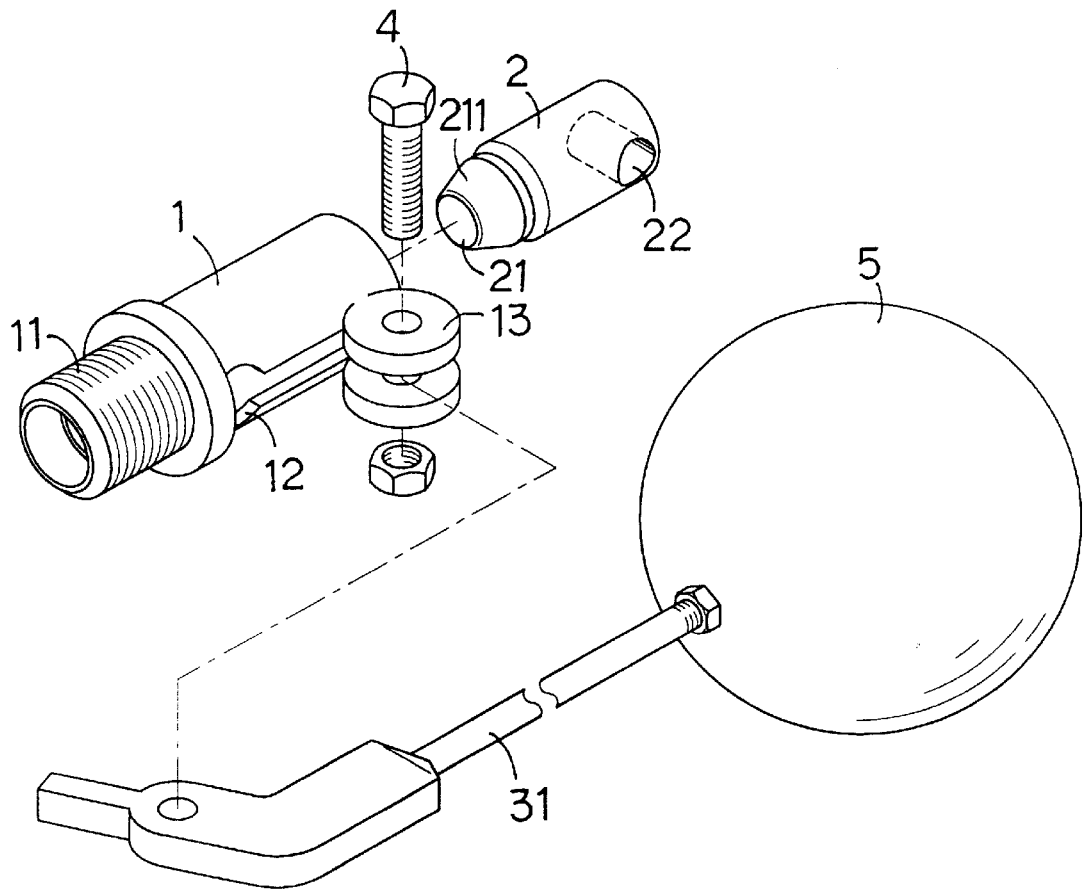
FIG. 1 is an exploded view of a conventional floating-ball valve.
Figure 2:
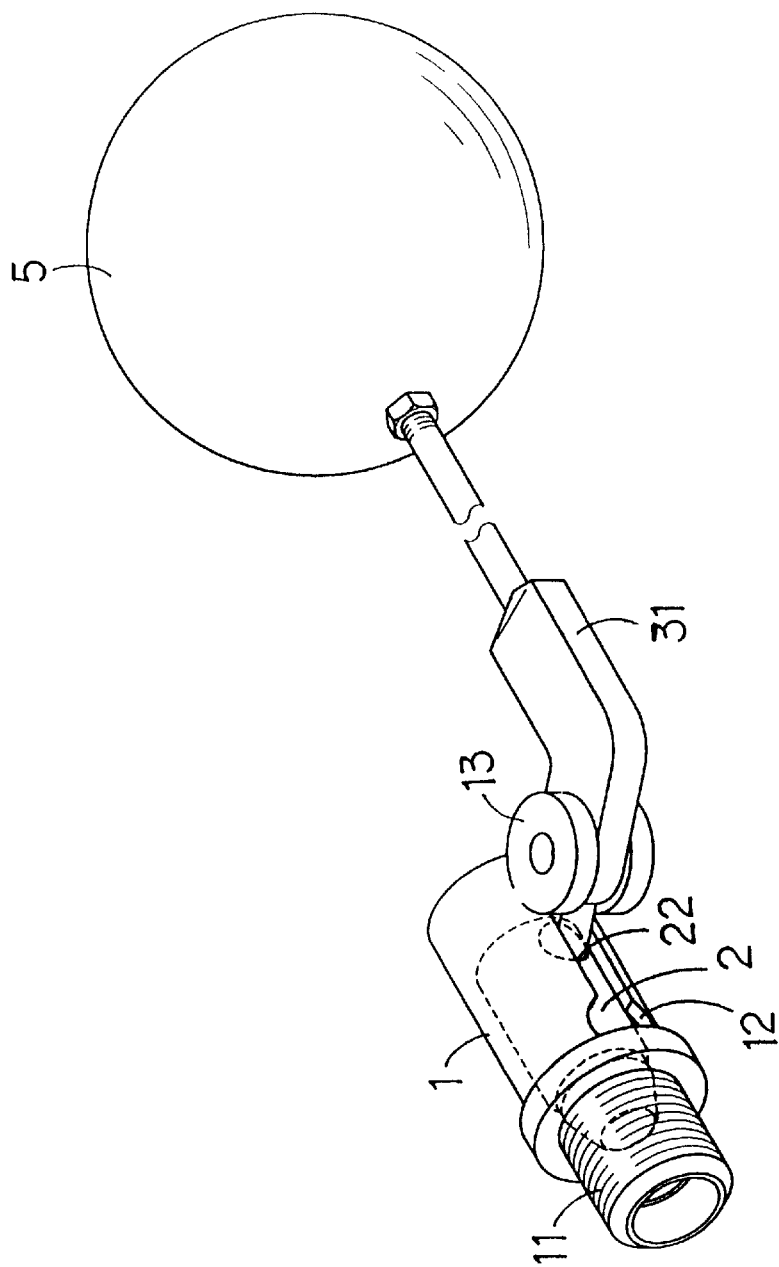
FIG. 2 is a perspective combination view of a conventional floating-ball valve.
Figure 3:
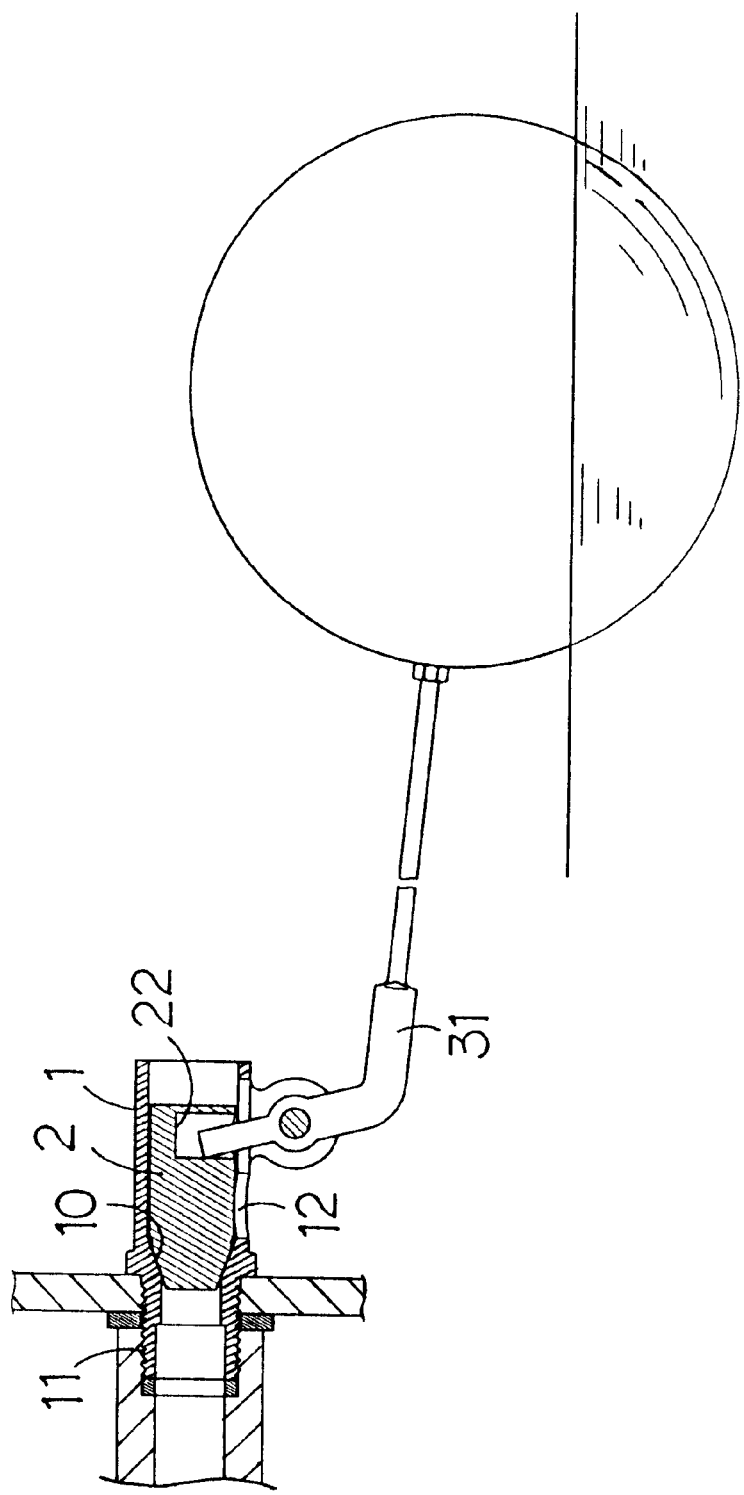
FIG. 3 is a sectional view of the conventional floating-ball valve, illustrating the water being blocked by the valve.
Figure 4:
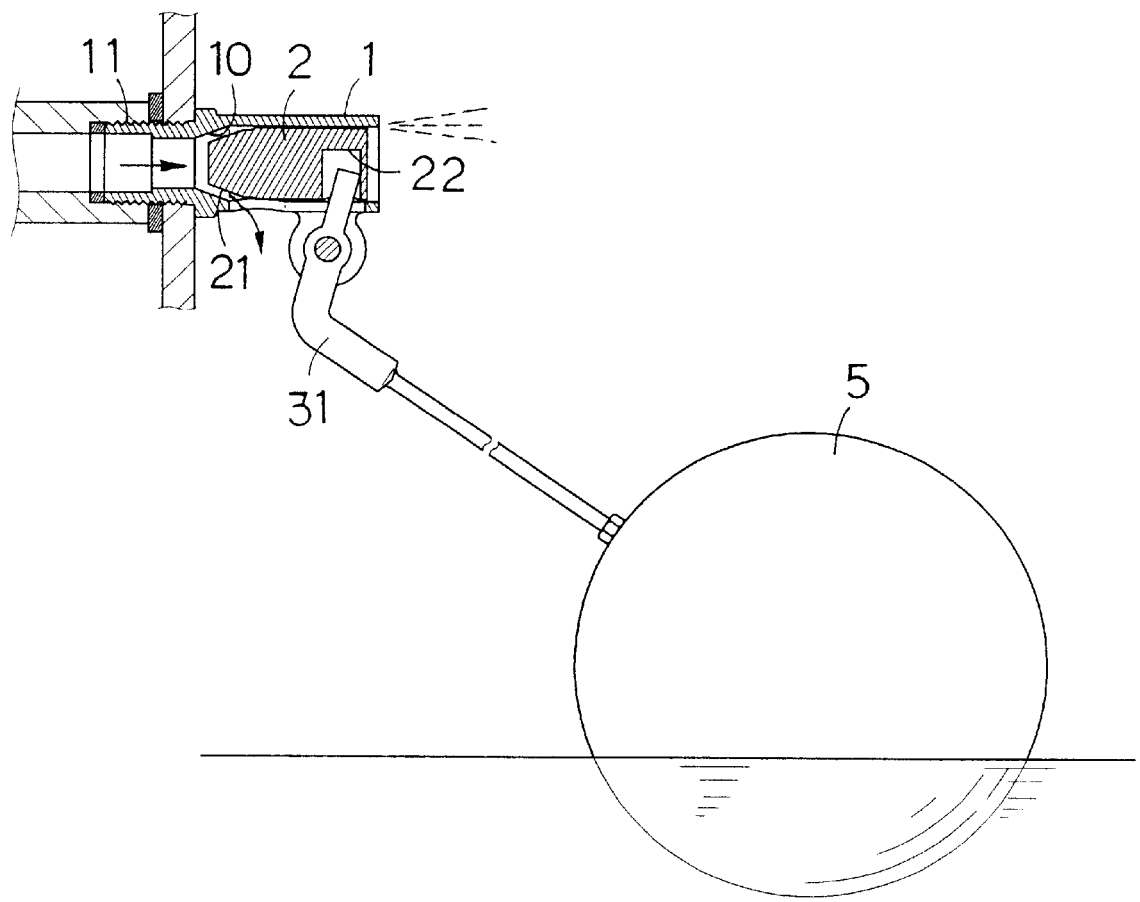
FIG. 4 is a sectional view of the conventional floating-ball valve, illustrating water entering via the valve.
Figure 5:
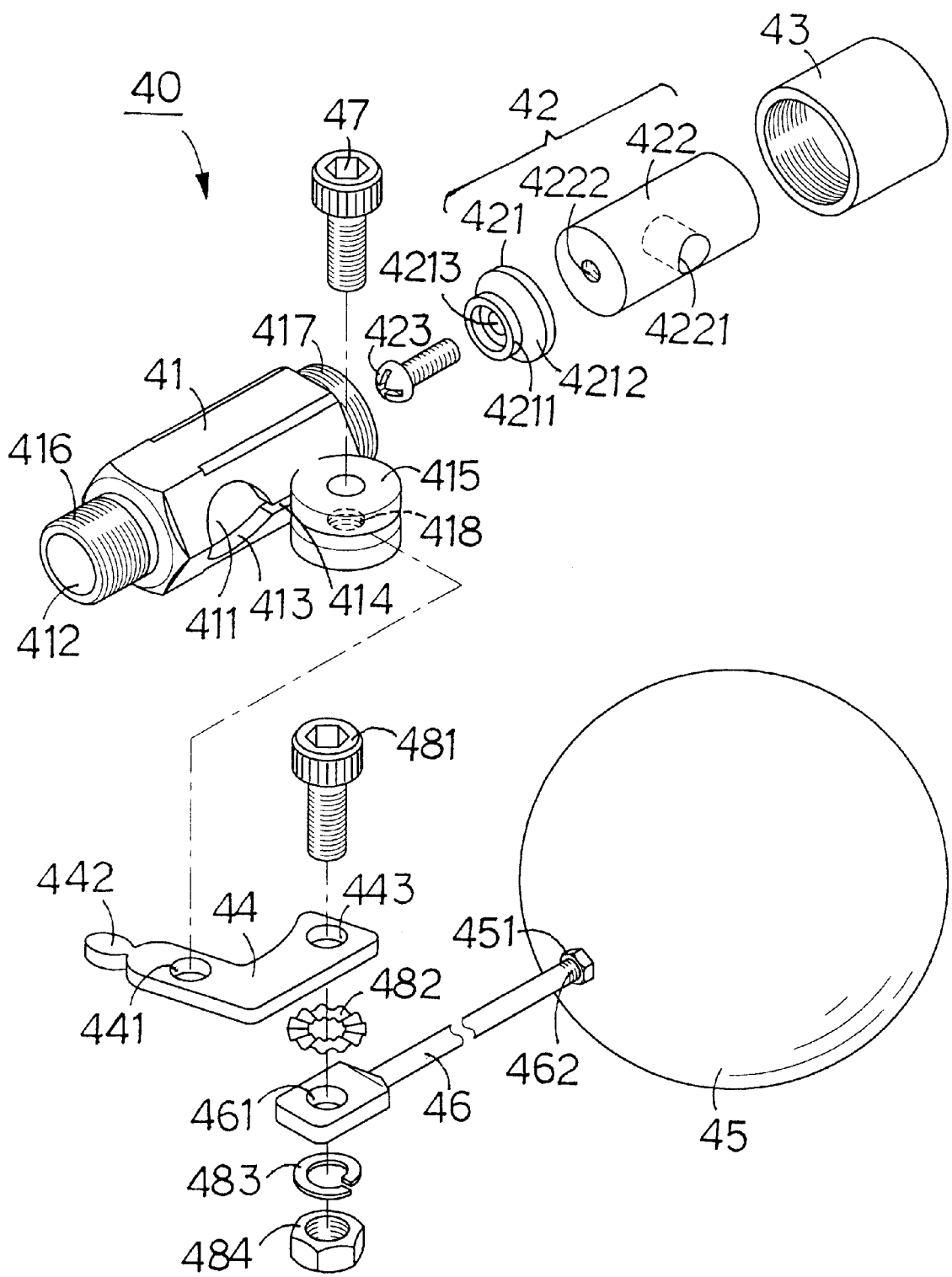
FIG. 5 is an exploded view of the floating-ball valve in accordance with the present invention.
Figure 6:
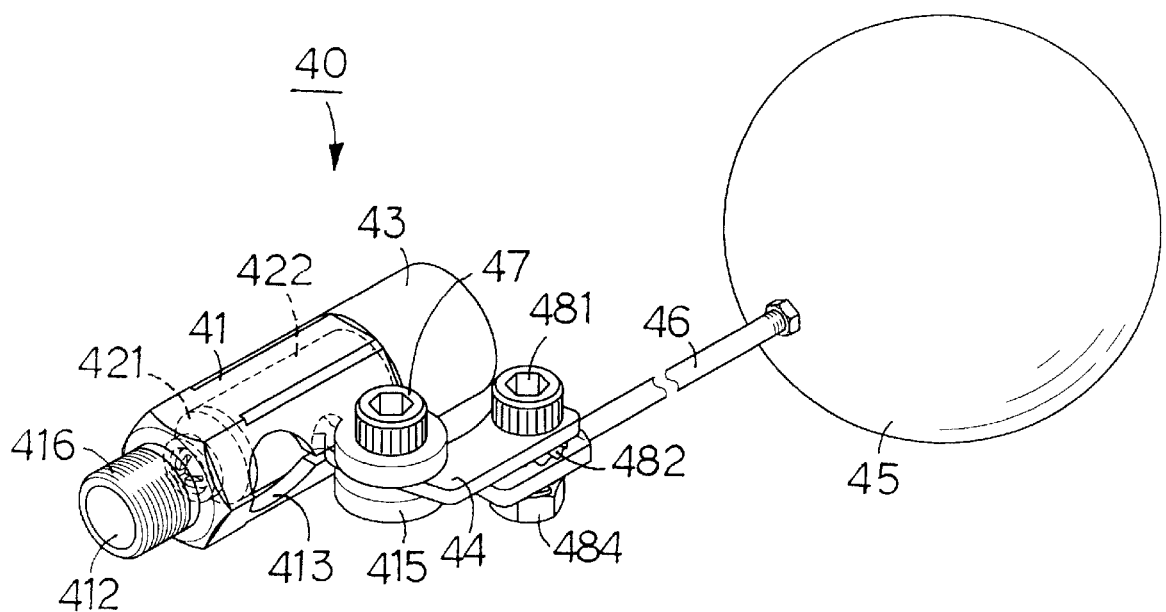
FIG. 6 is a perspective combination view of the floating-ball of the present invention.

FIGS. 4 and 5 illustrate the structure of the floating-ball valve 40 comprising a valve seat 41, a valve insert 42, a cap 43, a crankshaft 44, a float 45 with a floating arm 46, wherein the front end of the valve seat 41 is provided with an outer threaded tube 416 to be fastened to the wall of a water tank (not shown) with nuts. The rear end of the valve seat 41 is also provided with an outer threaded tube 417 which can be mounted with the cap 43. A valve chamber 411, an water inlet 412 are provided to the internal of the valve seat 41, and the water inlet 412 is a pipe hole. At the bottom of the valve chamber 412, a water outlet 413 is provided and is in communication with an elongated slot 414. At the bottom of the valve seat 41, a pair of corresponding protruded members 415 are provided and one of the protruded member 415 has a threaded hole 418, and a screw 47 is used to mount the crankshaft 44 via a pore 441 thereon and the threaded hole 418 on the member 415 such that the crankshaft 44 can swing with the screw 47 as the center.

In accordance with the present invention, the crankshaft 44 is substantially an L-shaped structure having one end being provided with the pore 441 and a protruded rocking member 442 which can insert into a cylindrical slot 4221 at the bottom of a valve steam 422. When the crankshaft 44 moves, the valve insert 42 moves in linear. The other end of the crankshaft 44 is provided with a pore 443 and a screw 481 passes through the pore 443 and in combination with a corrugated disc 482 and the pore 461 at the end handle of the floating arm 46, and secured the floating arm 46 together with a seal 483 and a nut 484. Besides, the other end of the floating arm 46 being a threaded bolt 462 which can be inserted into the float 45 and then secured by a screw nut 451.

In accordance with the present invention, the valve insert 42 consists of a valve plug 421 and a valve steam 422 being mounted together by a screw 423 (or by a rivet), wherein the valve plug 421 is made from plastic materials and has a front protruded rim 4211 and a rear conic face 4212 and a pore 4213 at the center thereof. The screw 423 mounts the valve plug 421 to the valve steam 422. The valve steam 422 is a metallic body and the center of the bottom face is a cylindrical slot 4221. The center of the valve steam 422 is a threaded hole 4222 allowing the screw 423 to be fastened thereon.

Figure 7A:
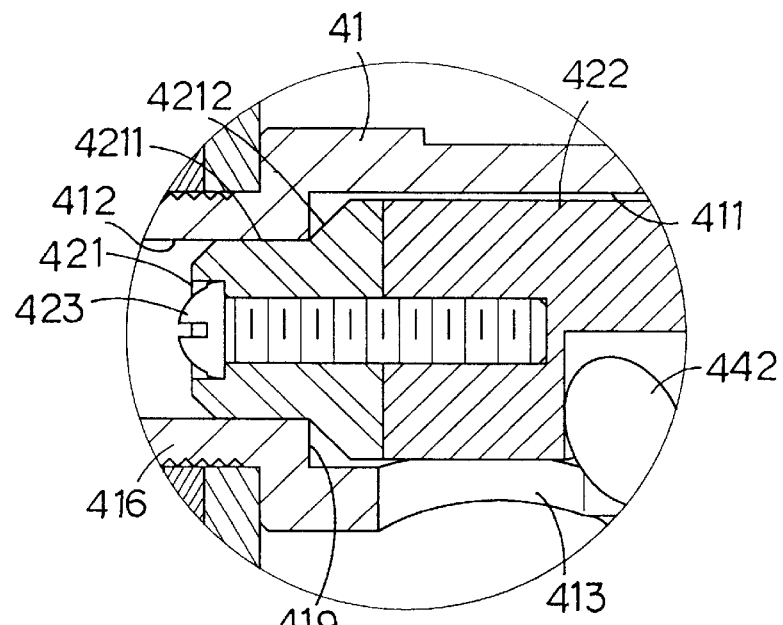
FIG. 7 is a sectional view of the floating-ball valve, illustrating the water being blocked by the valve of the present invention.
Figure 7:
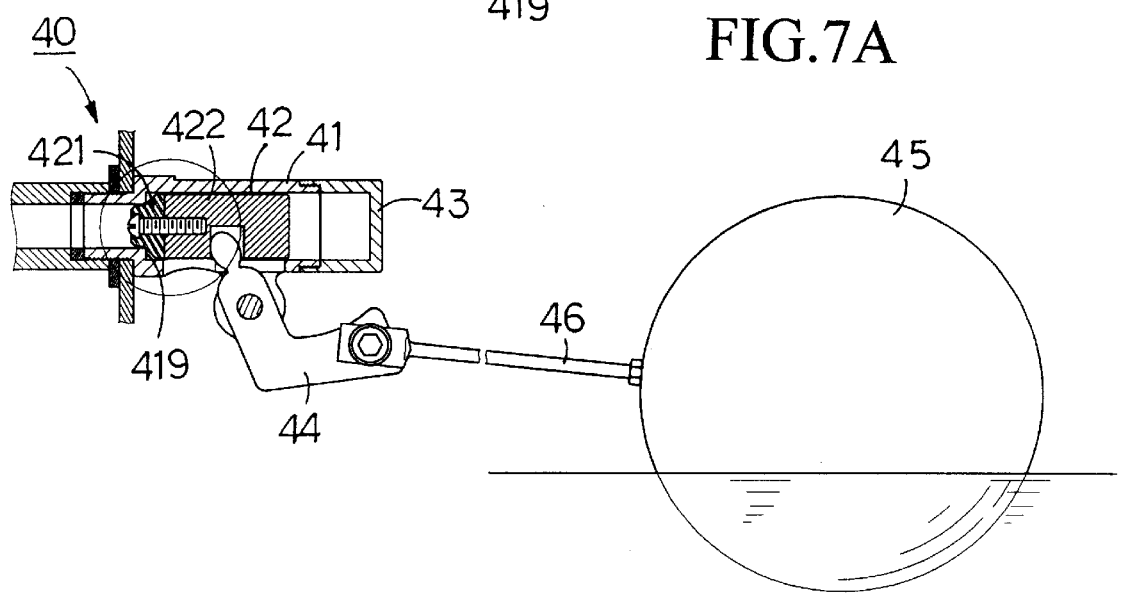

Referring to FIG. 7, there is shown an elevational view of the floating-ball valve in accordance with the present invention. At this instance, the valve 40 is at the state of water being blocked. The water in the water tank is at a full water level, and the float 45 rises and the floating arm 46 swings clockwise with the screw 47 as the center, and the top rocking element 442 drives the valve steam 422 to move forwards (refer to FIG. 7A) so that the external wall of the protruded rim 4211 of the valve plug 421 and the wall of the water inlet 412 are closed to form a first water-blockage structure, and the conic face 4212 of the valve plug 421 is sealed with the wall of the vertical water-blockage wall 419 to form a second water blockage structure. The valve plug 421 is made of high temperature resistant TEFLON material, and is effective in water-blockage.

Figure 8:
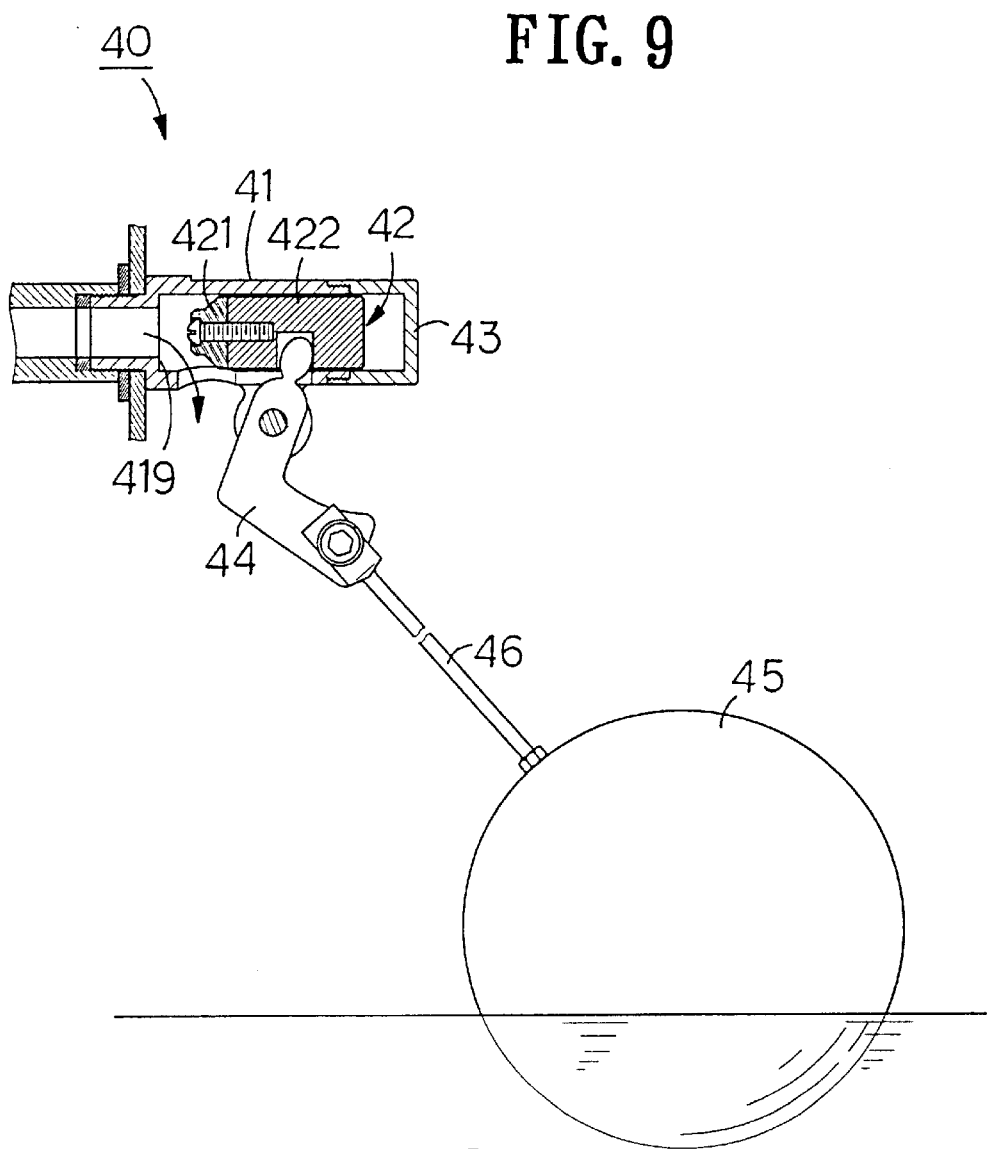
FIG. 8 is a sectional view of the floating-ball valve, illustrating water entering via the valve of the present invention.

Referring to FIG. 8, there is shown the floating-valve 40 at the state of water entering the tank. At this instant, the water tank contains insufficient water and the float 45 is at a low level. The floating arm 46 swings the counterclockwise about the screw 47 as the center and the rocking member 442 at the top of the floating arm 46 drives the valve steam backward. Thus, the valve insert 42 is disengaged from the water-blockage wall 419 and causes the water outlet 413 of the valve seat 41 to fully open, and water flows through the water inlet 412 and discharges via the water outlet 413. At this instance, the opening at the rear end of the valve seat 41 is blocked by the cap 43, thus, water will not flow out therefrom. That is, water only flows out from the water outlet 413. Thus, if the present floating-ball valve 40 is used in the steam production apparatus or humidifier, the chilled water will flow downward to the tank via the water outlet 413 and will not eject via the rear opening of the valve seat 41 and mixed with the steam into the vacuum tube.

Figure 9:
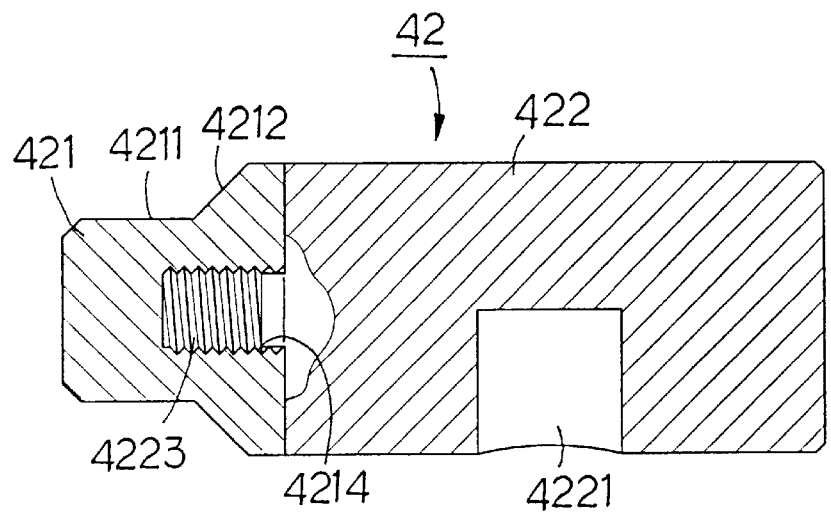
FIG. 9 is a structure of the valve cap in accordance with the present invention.

FIG. 9 is another preferred embodiment in accordance with the present invention, wherein the valve insert 42 consists of a valve plug 421 and a valve steam 422, and a threaded hole 4214 is provided to the valve plug 421. The threaded hole 4214 allows a threaded rod 4223 at the front end of the valve steam 422 to be mounted thereto without using a screw.

Figure 10:
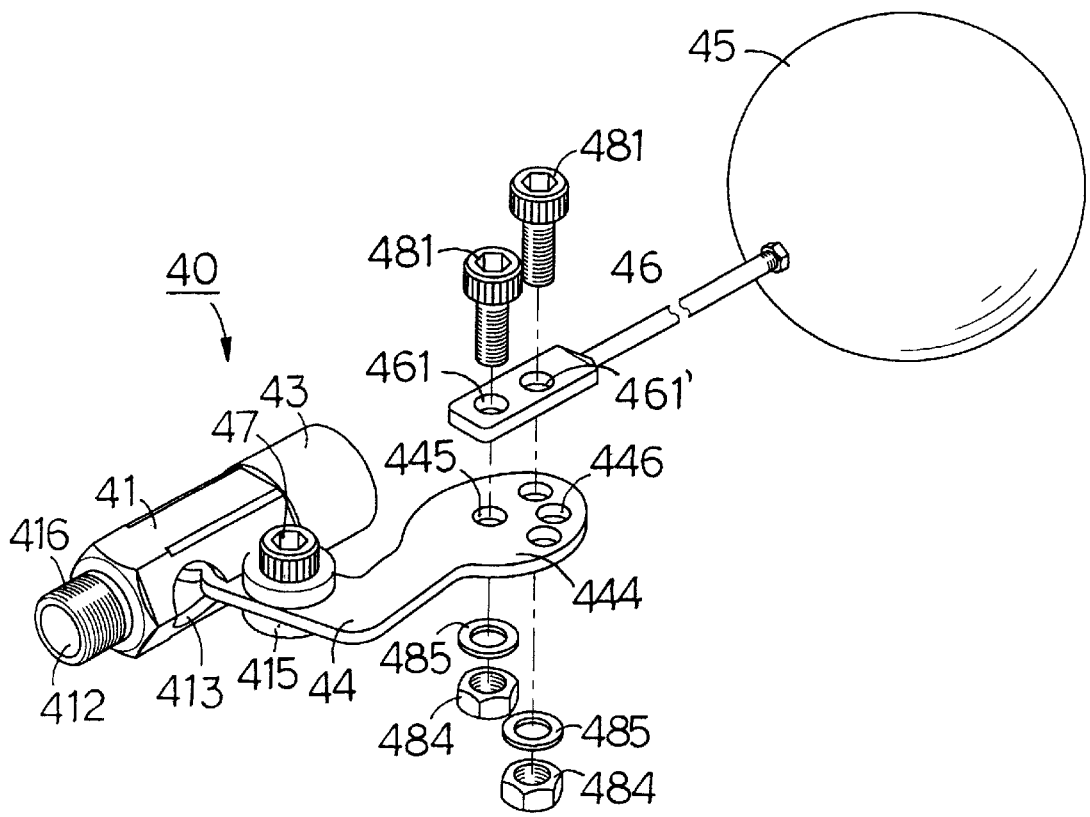
FIG. 10 is another preferred embodiment of the floating-ball valve in accordance with the present invention.
Figure 11:
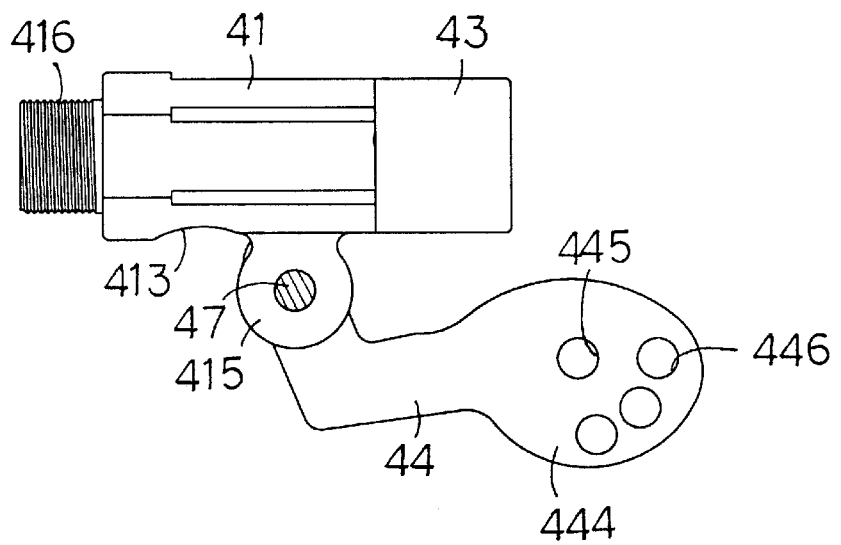
FIG. 11 shows the actuating shaft and the valve seat of FIG. 9 of the present invention.

FIG. 10 is another preferred embodiment in accordance with the present invention. In this preferred embodiment, the end terminal of the crankshaft 44 has an end handle 444. The end handle 444 is substantially an eccentric shaped disc such that the crankshaft 44 will not hit the bottom face of the valve seat 41 when the crankshaft 44 rises together with the floating arm 46. A center hole 445 is provided to the end handle 444 and a plurality of positioning holes 446 (refer to FIG. 11) are provided along the edge of the handle 444. The end of the floating arm 46 is provided with two pores 461, wherein one of the pores 461 aligns with the center hole 445 which can be fastened by a screw 481 and a seal 485, and then secured with a nut 484. The other pore 461 aligns with one of the positioning hole 446 of the crankshaft 44 and then mounted with a screw 481 and a seal 485, and secured with a nut 484. In accordance with the present invention, the position of the pores 461 is determined by the structure of the water tank and the water level, and the appropriate angle of the positioning hole 446.

Figure 12:
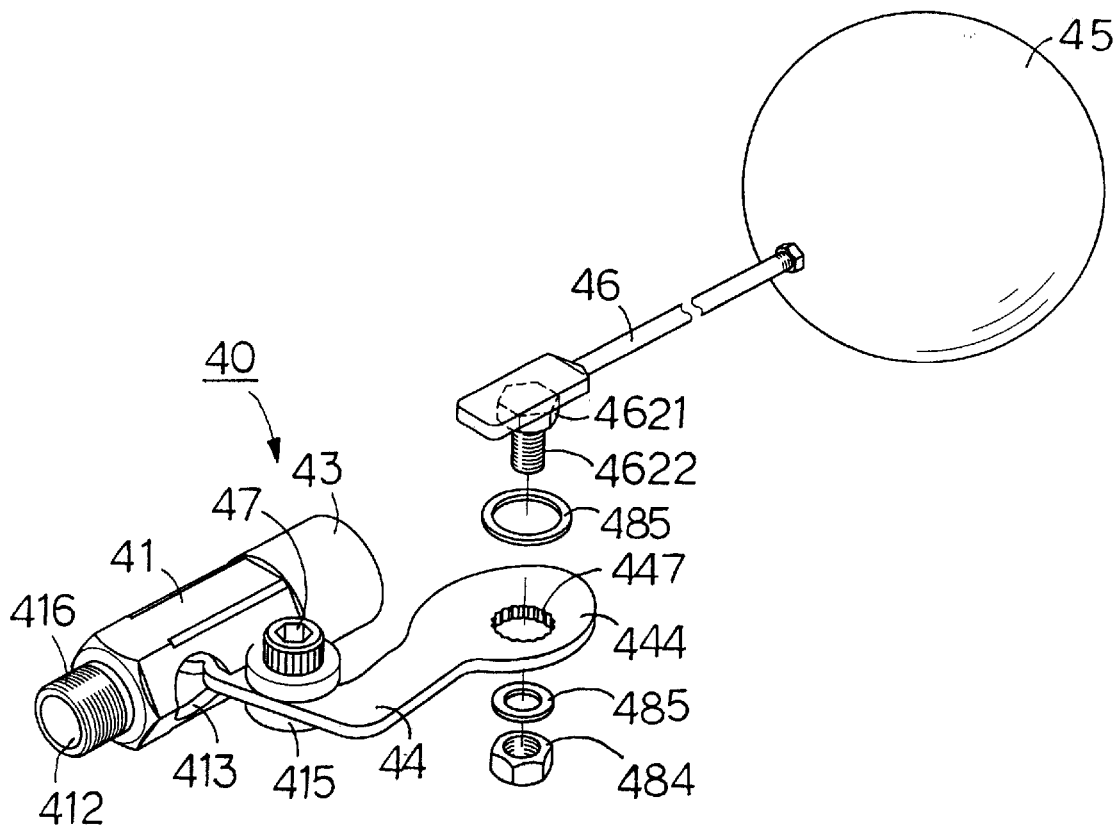
FIG. 12 is another preferred embodiment of the floating-ball valve in accordance with the present invention.
Figure 13:
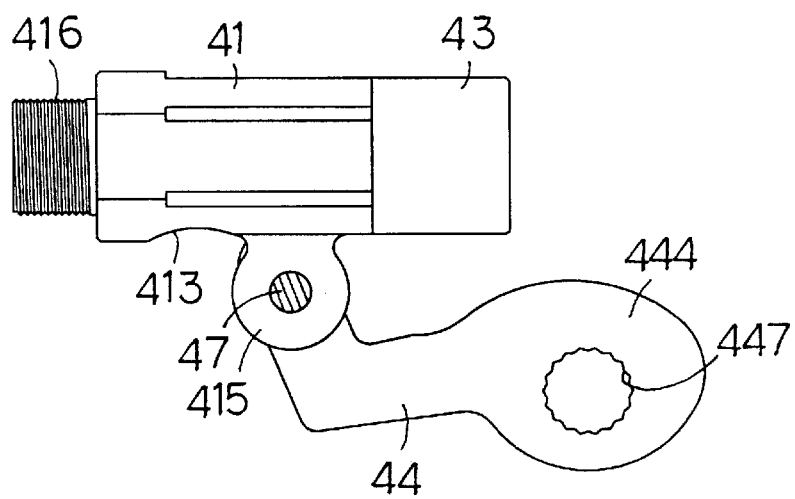
FIG. 13 shows the combination of the actuating shaft and the valve seat of FIG. 12 of the present invention.

FIG. 12 is another preferred embodiment of the floating-ball valve. In accordance with the preferred embodiment, the eccentric end handle 444 of the crankshaft 44 is provided with a geared hole 447 (refer to FIG. 13), in combination with a hexagonal screw nut 4621. After the nut 4621 is combined with the geared hole 47, the end handle 444 is secured to the protruded member 415 of the valve seat 41. The threaded steam 4622 can be combined with a seal 485 and a nut 484 after it passes through the geared hole 447. In accordance with the present invention, the floating arm 46 is provided with a various positioning angle with respect to the end handle 444 of the crankshaft 44.

Figure 14:
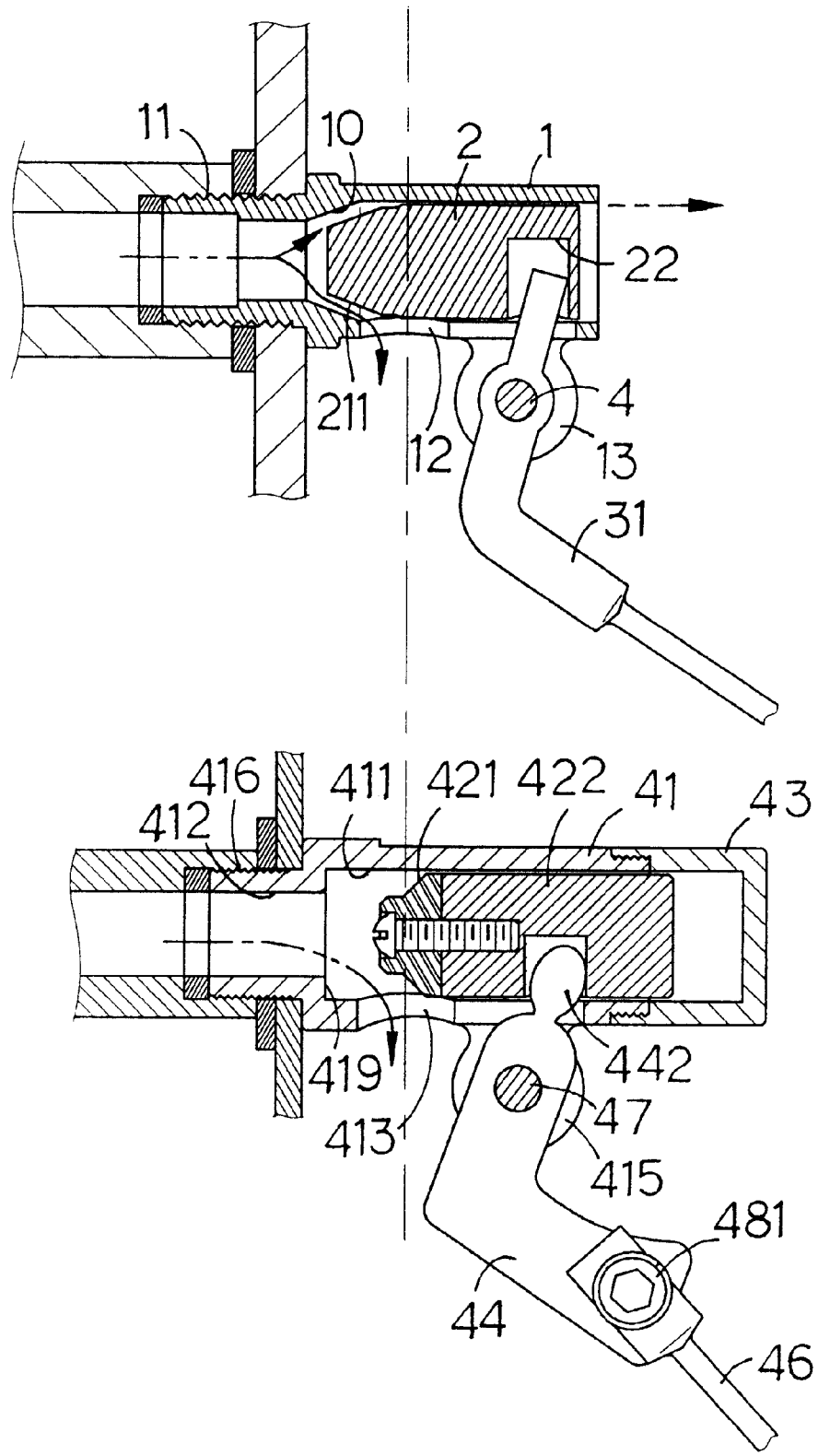
FIG. 14 illustrates a comparison of the conventional floating-ball valve and the floating-ball valve of the present invention.

FIG. 14 is a comparison of the conventional floating-ball valve and the floating-ball valve of the present invention. The cylindrical slot 22 of the valve insert 2 is provided at the end terminal thereof. The cylindrical slot 4221 of the present invention is provided at the center of the valve steam 421. Thus, when the valve insert 422 moves backward to allow water to enter, the water outlet 413 of the valve seat 41 can open fully while the water outlet 12 of the conventional structure cannot. Accordingly, the flowing of water of the present invention is smooth. In the conventional structure, as a result of partial open of the water outlet, a partial of water will flow out from the end of the valve seat 1.

If the cylindrical slot 22 of the conventional structure is provided at the center of the valve insert 2, the inner conic face 10 of the valve seat 1 cannot be fully sealed. Thus, the floating-ball valve of the present invention provides excellent performance as compared to the conventional valve.

The present invention may, of course, be carried out in other specific ways than-those herein set forth without departing from the spirit and essential characteristic of such invention. The respect embodiments are; therefore, to be considered in all respects as illustrative and not restrictive and all charges coming within the meaning and equivalency range of the appended claims are intended to be embraced thereon.

What is claimed is:

1. An improved structure of a floating-ball valve for industrial fluid comprising a valve seat, a valve insert, a cap, a crankshaft, a float and a floating arm, wherein a valve chamber is formed at an internal of the valve seat, the internal of the valve seat having a water inlet, the internal of the valve seat and the water inlet being pipe holes of various diameters, a lower section of the valve chamber being provided with a water outlet and an elongated slot in communication with the water outlet, a bottom of the valve seat being provided with a pair of corresponding protruded members each pivotally mounted with a rocking arm, one end of the crankshaft being connected to the floating arm, the valve insert being mounted within the valve chamber characterized in that a vertical water-blocking wall is formed in between the valve chamber and the water inlet, and the valve insert consists of a metallic valve stem and a plastic valve plug, the valve plug has a front protruded rim and a rear conical face, an external wall of the protruded rim is sealable with a wall of the water inlet to form a first water-blocking structure, and the conical face is sealable with a wall hole of the water-blocking wall to form a second water-blocking structure, the crankshaft is substantially L-shaped and pivots in between the two protruded members, a top end of the crankshaft is a rocking member being inserted into a cylindrical slot, and another other end of the crankshaft is connected to an end of the floating arm, and an opening at an end of the valve seat is provided with a plurality of external threads for mounting with a threaded cap to seal the opening, an end of the crankshaft has a pore for mounting with the floating arm, an end handle of the crankshaft has a center hole and a plurality of positioning holes arranged in a fan-like manner, and the end handle of the floating arm is provided with a front and a rear pores, one of the pores is for a center hole of the crankshaft and the other for a positioning hole of the crankshaft, the end handle of the crankshaft is provided with a geared hole for positioning of a hexagonal screw nut, the cylindrical slot is mounted at a center bottom of the valve stem, the valve plug is provided with a threaded hole which is used for mounting with a threaded bolt, and the valve plug is provided with a pore for mounting with the valve stem.

* * * * *